United States Patent [19]

Olear

[11] 4,323,456
[45] Apr. 6, 1982

[54] CORNER SWEEP MECHANISM FOR SQUARE SETTLING TANK

[75] Inventor: John Olear, Cheshire, Conn.

[73] Assignee: Dorr-Oliver Incorporated, Stamford, Conn.

[21] Appl. No.: 183,106

[22] Filed: Sep. 2, 1980

[51] Int. Cl.³ .............................................. B01D 21/18
[52] U.S. Cl. .................................................. 210/529
[58] Field of Search ............... 210/525, 528, 529, 531

[56] References Cited

U.S. PATENT DOCUMENTS

| | | | |
|---|---|---|---|
| 1,457,794 | 6/1925 | Piper | 210/529 |
| 1,957,185 | 5/1934 | Weber et al. | 210/529 |
| 2,261,487 | 11/1941 | Scott et al. | 210/529 |
| 3,140,259 | 7/1964 | Kelly | 210/528 |
| 3,191,775 | 6/1965 | Schepman | 210/528 |
| 3,465,887 | 9/1969 | Cookney | 210/528 |
| 3,770,132 | 11/1973 | Quast et al. | 210/525 |
| 4,043,920 | 8/1977 | Wook | 210/529 |

Primary Examiner—Theodore A. Granger
Attorney, Agent, or Firm—Burtsell J. Kearns; Harold M. Snyder

[57] ABSTRACT

A corner sweep mechanism for a square shaped settling tank and which mechanism is pivotally connected to the end of a main rotary rake structure and comprises a lightweight buoyant frame structure which includes a rake or sweep arm adapted to be extended into the corner areas of the tank bottom under the control of a tension spring without the use of counterweights during rotation of the main rake structure.

6 Claims, 8 Drawing Figures

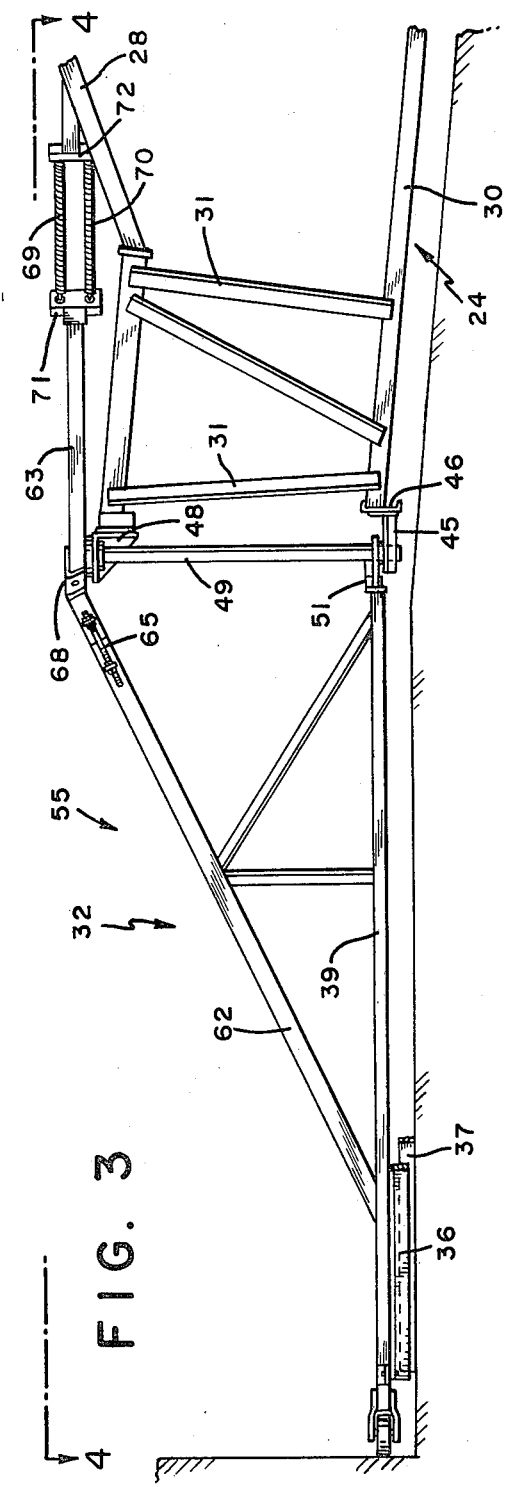
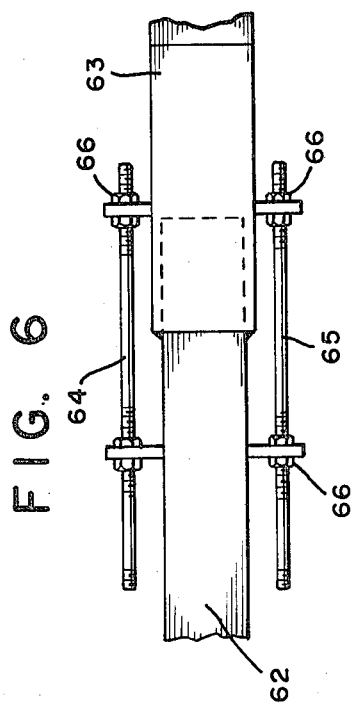
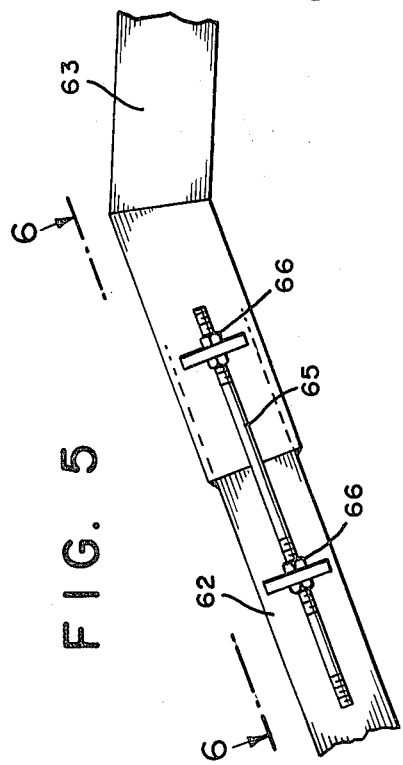

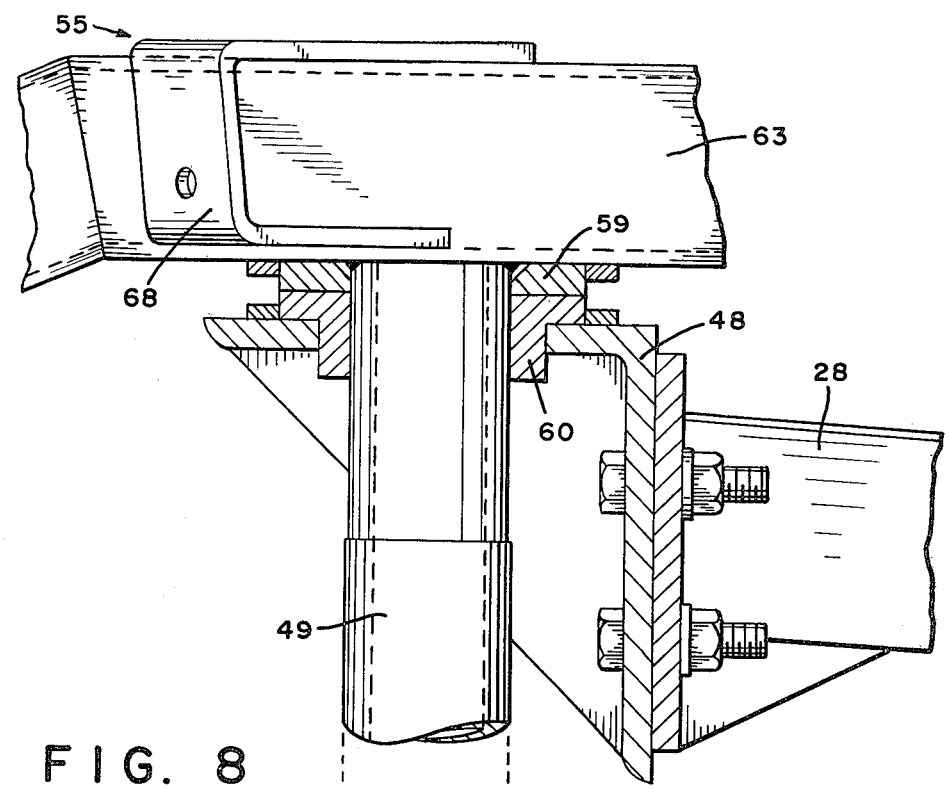
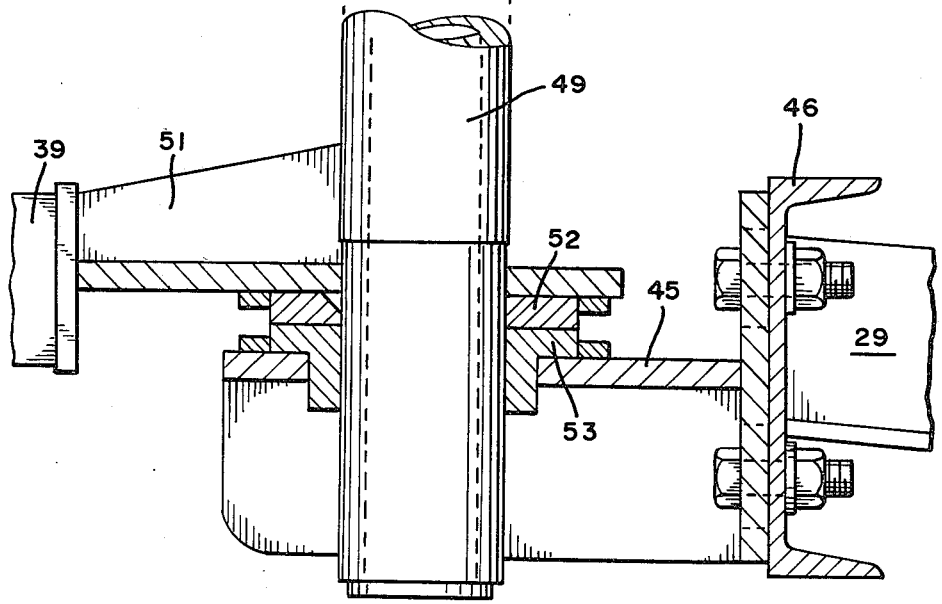
FIG. 8

CORNER SWEEP MECHANISM FOR SQUARE SETTLING TANK

BACKGROUND OF THE INVENTION

This invention is directed to sedimentation apparatus and in particular to corner sweep rake mechanisms for clarifiers or thickeners of the type utilizing non-circular or cornered settling tanks.

Settling tanks of the type mentioned are of a generally square-shaped configuration in horizontal cross-section and are well known for use in the treatment of wastewater or sewage in the separation of solids from a solids-liquid suspension. These settling tanks generally comprise vertical sidewalls with an overflow launder provided about the upper periphery of the sidewalls for receiving the supernatant liquid from the solids-liquid suspension. A central rotary rake structure is provided for raking sludge or other solids that settle from the liquid suspension to a central sump outlet located in the tank bottom. The main raking structure usually consists of a pair of 180° displaced radially extending rake arms which are rotatably mounted at the base of a center support column within the tank. Since the raking area or sweep of the raking structure is limited by the diameter of the path or rotation of the rake arms, it is necessary and well known to provide auxiliary or corner sweep mechanisms attached or hinged to the outer ends of the main rake structure which are extendible into the corners of the tank bottom to sweep solids settled therein which are not reachable by the rake arms.

The mentioned square type settling tank has met with success, for example, in installations where a circular tank is not desirable due to limited space availability. The corner sweep mechanisms for these known settling tanks comprise a supplemental rake or sweep arm structure pivotally mounted to the main rake arm and urged into contact with the inner wall surfaces of the settling tank by counterweights or by the combination of tension springs and counterweights. As the rake structure is rotated past the cener line of the tank the sweep arm is maintained in a retracted position and as the rake arm passes a corner the sweep arm is extended into and around the corner curve of the tank to clear the tank bottom in these areas of settled solids by raking the latter into the path of the rake blades of the main rake structure.

Prior art corner sweep raking mechanisms are typified by the devices disclosed in the following U.S. Pat. Nos.:

1,457,794
1,603,995
1,957,185
2,053,636
2,238,024
2,259,230
2,261,487
2,863,564
3,770,132

Although the corner sweep mechanisms of these prior disclosures may have proven effective for their intended purposes they generally comprise excessive structural mechanisms which include sheaves, cables, counterweights and yoke structures or require special castings or the like. As a result known arrangements are of a generally heavy or complex construction which increases the torque and force requirements of the main rake and drive structure during operation.

It is an object of the present invention to provide a novel corner sweep mechanism for a non-circular settling tank without the utilization of counterweights.

Another object is to provide a novel corner sweep mechanism which is of a lightweight and buoyant construction.

A further object is to provide a corner sweep mechanism having integral means for readily adjusting the height of the sweep arm relative to the tank bottom.

BRIEF SUMMARY OF THE INVENTION

The present invention contemplates a novel corner sweep mechanism for a non-circular settling tank and which mechanism includes a lightweight buoyant frame structure. A pivot arm member of the frame is pivotally mounted to the main rake arm structure and a trailing corner sweep arm is connected to the outer end of the pivot arm with a squeegee blade thereon to rake solids on the tank bottom in the direction of the main rake structure. The pivot arm is continuously urged in the direction of the inner wall surface of the settling tank by a tension spring interconnected to the main rake structure and a control arm for the pivot member. The parts of the frame supporting the sweep arm are of a hollow construction and sealed at opposite ends to provide buoyancy to the sweep arm as it is moved through a solids-liquid suspension.

The above and other objects and advantages of the present invention will appear more fully hereinafter from a consideration of the detailed description which follows taken together with the accompanying drawings wherein one embodiment of the present invention is illustrated.

DESCRIPTION OF THE DRAWINGS

In the Drawings:

FIG. 3 is an enlarged elevational view of a corner sweep mechanism;

FIG. 5 is an enlarged view of the height adjustment means for the corner sweep mechanism;

FIG. 6 is a plan view of the height adjustment means of FIG. 5;

FIG. 8 is a fragmentary elevational view partly in cross-section of the pivot mounting for the corner sweep mechanism.

DETAILED DESCRIPTION

Figure 1:
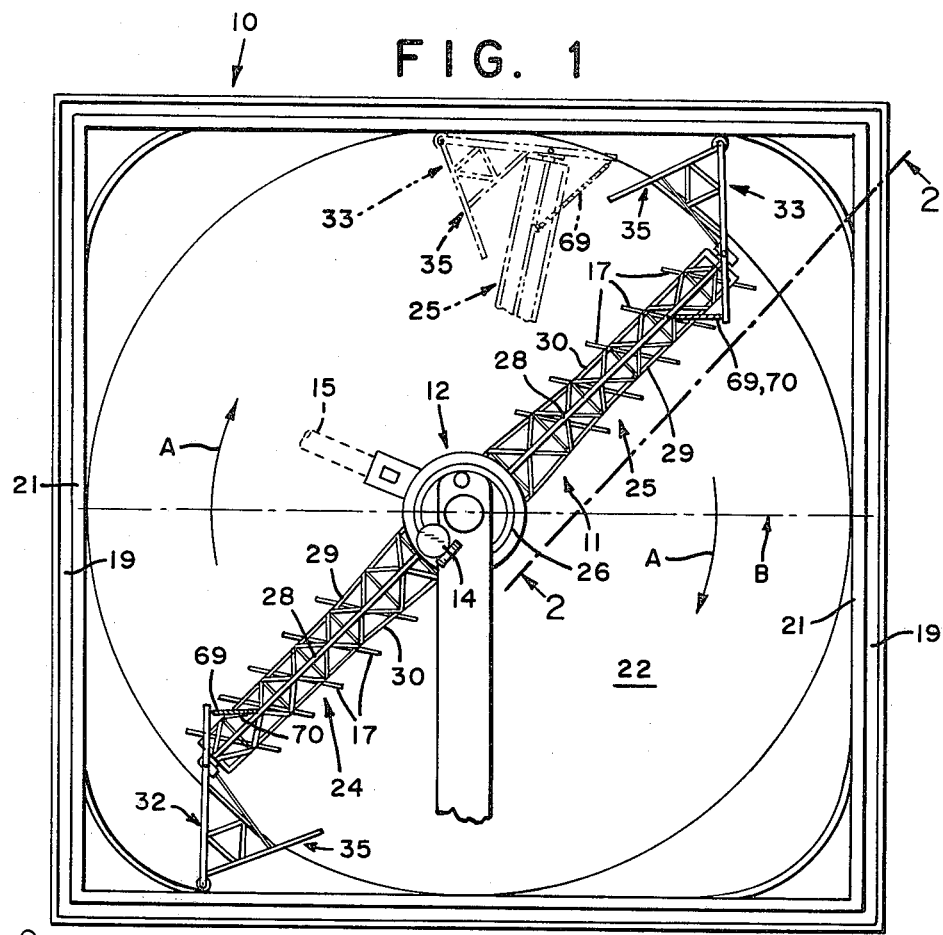
FIG. 1 is a semi-diagrammatic fragmentary plan view of a square shaped settling tank which incorporates one embodiment of the present invention.
Figure 2:
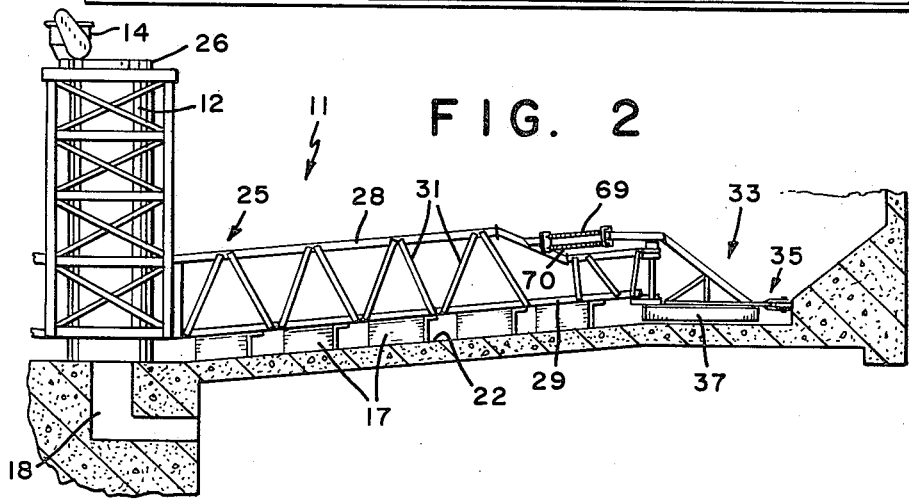
FIG. 2 is a fragmentary cross-sectional elevational view of the settling tank taken on the line 2—2 of FIG. 1 showing one rake arm of the main rake structure and an auxiliary corner sweep mechanism attached thereto.

Referring now to the drawings for a more detailed description of the present invention, a sedimentation settling tank incorporating an embodiment thereof is generally indicated by the reference numeral 10 in FIG. 1. A main rake structure 11 (FIGS. 1 and 2) is supported for rotation on a center column 12 upon which is also mounted the rake drive mechanism 14. A solids-liquid suspension to be treated in settling tank 10 is supplied thereto through a feed inlet pipe 15. Settled solids or sludge are adapted to be raked by blades 17 of rake structure 11 to a sump outlet 18 in a well known manner. An overflow launder 19 (FIG. 1) extends about the upper periphery of tank 11 and defines the liquid level in the tank and for receiving the supernatant liquid for appropriate discharge from the tank.

Settling tank 10 may be made of any suitable material such as concrete and as shown in FIG. 1 is of a generally square configuration comprising vertical sidewalls 21 and a bottom 22 providing a cornered noncircular bottom area for receiving settled solids. Main raking structure 11 is of a usual construction and embodies spaced rake arms 24 and 25 attached to a suitable bearing means (not shown) at the bottom of center column 12 and through appropriate connection means to drive mechanism 14 at the top 26 of the column 12.

Figure 7:
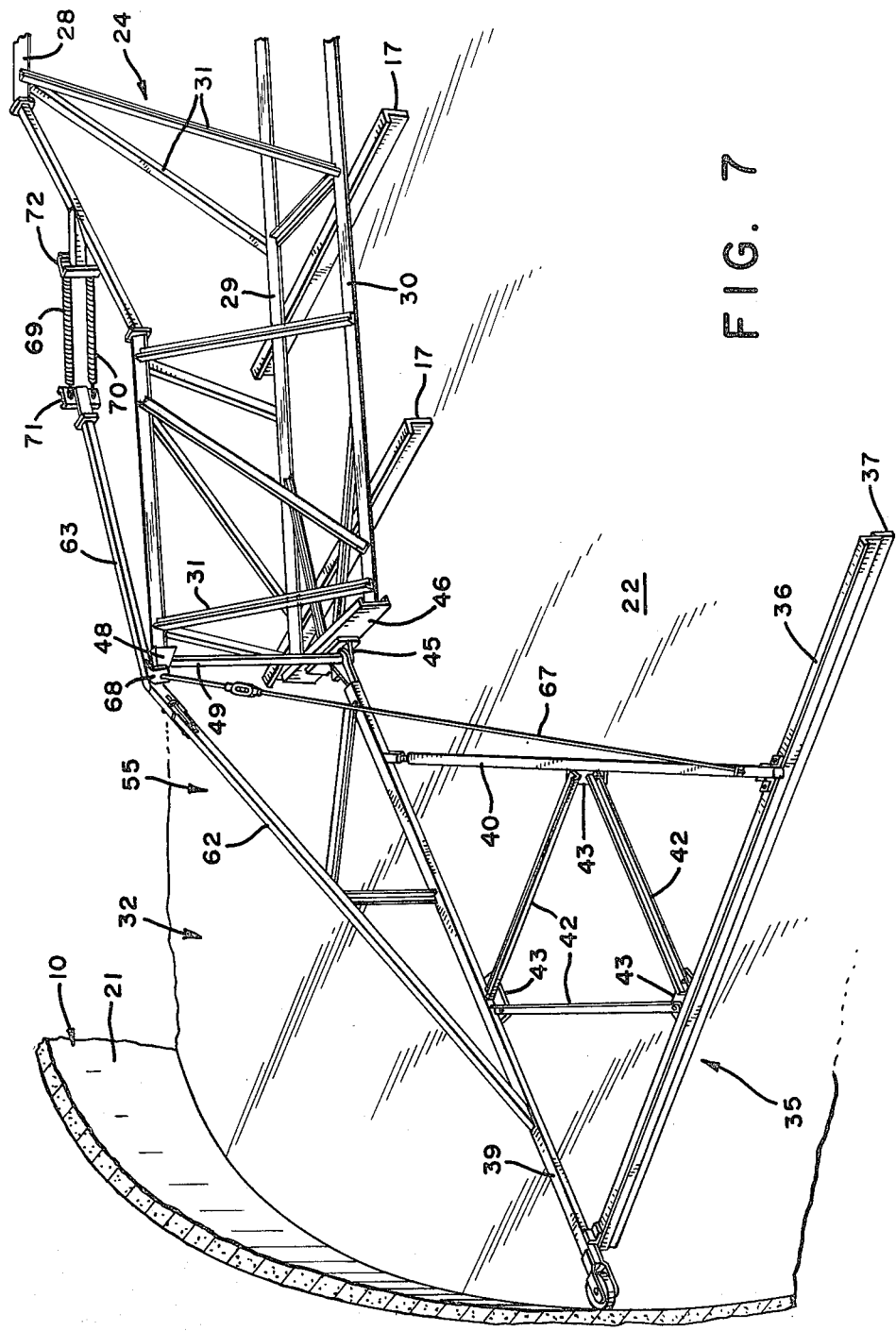
FIG. 7 is a perspective view of the corner sweep mechanism of FIGs. 3 and 4.

Rake arms 24 and 25 comprise steel cage structures which are triangular shaped in vertical cross section and which cages are each formed of a top chord or angle member 28 and spaced lower angle bar members 29 and 30 (FIGS. 6 and 7) which are maintained in a rigid structure by diagonal bracing members 31. Raking blades 17 are attached to the bottom surface of bars 29–30 and are inclined rearwardly and inwardly in respect to the forward path of travel (as indicated by the arrow A in FIG. 1) of rake arms 24–25 whereby blades 17 engage and transfer solids settled on bottom 22 toward and into sump 18 of settling tank 10 in a well known manner.

Figure 4:
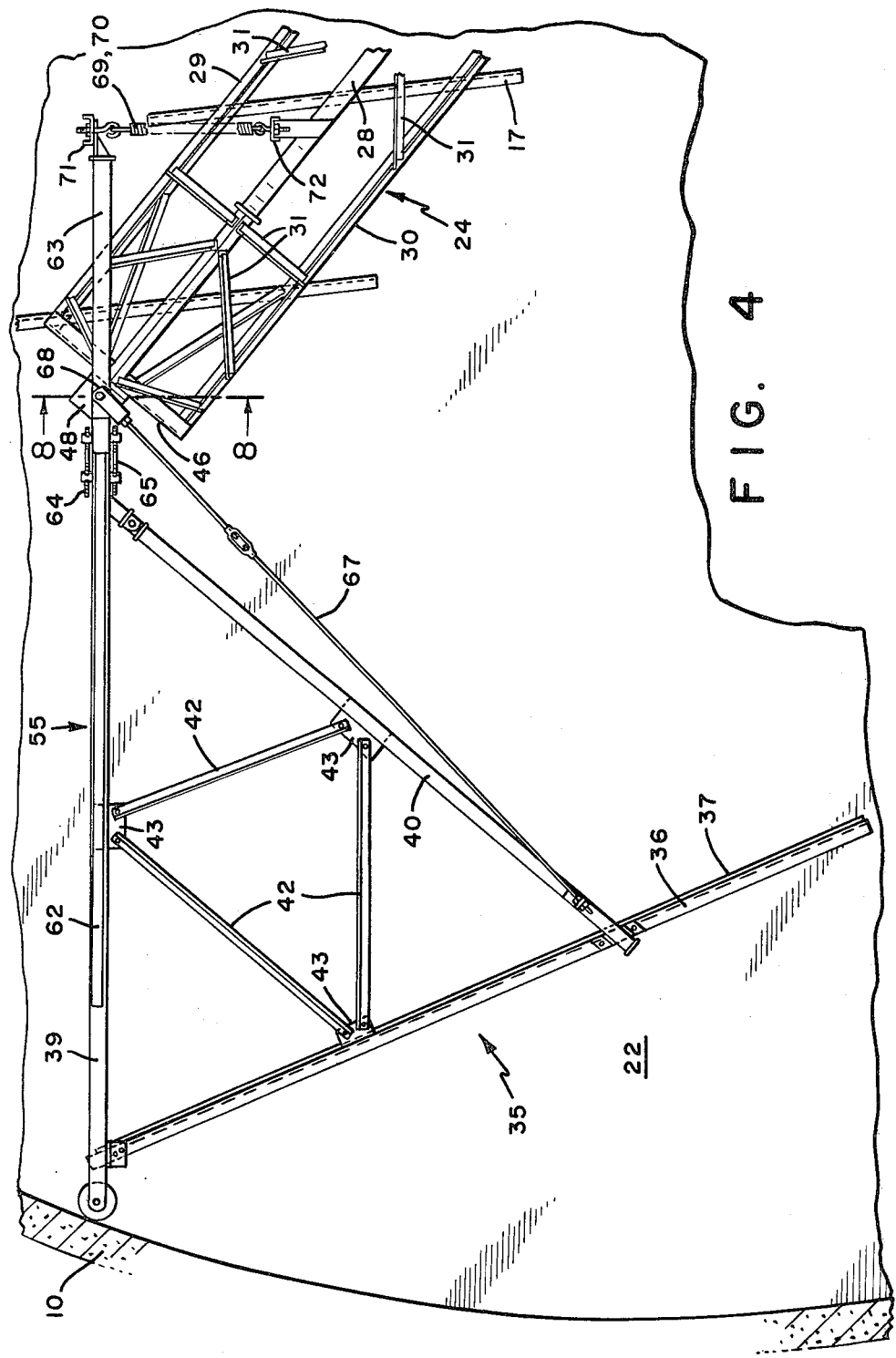
FIG. 4 is a plan view of the corner sweep mechanism of FIG. 3.

As mentioned, it is the object of the present invention to provide a novel lightweight auxiliary raking mechanism for sweeping or cleaning the corner areas of tank bottom surface 22. To this end identical corner sweep mechanisms 32 and 33 (FIG. 1) are respectively pivotally attached to the outer ends of rake arms 24 and 25. As seen with respect to the corner sweep mechanism 32 in FIGS. 3, 4 and 7, each of the latter mechanisms includes a lower raking frame structure 35 of a generally isosceles triangular shaped configuration. A sweep arm comprising an L-shaped bar member 36 forms the base of the triangular frame 35 and is inclined in the direction of rake blades 17 of rake arm 24. A metal squeegee 37 is secured to a lower marginal portion of bar member 36 to complete the sweep arm.

The remaining two sides of the frame triangle 35 include an elongated pivot arm 39 and a support arm 40. Arms 39 and 40 are of a hollow rectangular shape and are sealed at the opposite ends thereof so as to be watertight and provide buoyancy to frame 35 as the latter is moved though a solids-liquid suspension in tank 10. Bracing members 42 are arranged in the form of a triangle within the plane of frame 35 and are bolted to frame members 36, 40 and 41 at brackets 43 welded to the arms to maintain the frame in a rigid configuration.

Frame 35 is pivotally secured to rake arm 34 by a dual pivot connection which includes a first or lower bearing bracket 45 (FIGS. 7 and 8) secured to a bar member 46 interconnected at opposite ends to lower chords 29 and 30 of rake arm 24 and a second or upper bearing bracket 48 secured to the end of top chord 28 of rake arm 24. A vertical pivot pin 49 has its opposite ends inserted in apertures formed in bearing brackets 45 and 48. Pin 49 is connected to pivot arm 39 by an interconnecting bracket 51 secured thereto and to the end of pivot arm 39. Bracket 51 is spaced from lower bearing bracket 45 by a bushing member 52 secured to its lower surface and a second bushing member 53 secured to lower bearing bracket 45. Bushings 52 and 53 are preferably made of a composition material suitable to provide a bearing surface during pivotal movement of frame 35. A second pivot connection includes a two piece control arm 55 for corner sweep mechanism 32 which extends from pivot arm 39 to upper bearing bracket 48 and is welded thereat to the top surface of pivot pin 49. A bushing 59 (FIG. 8) is attached to the undersurface of control arm 55 to engage bushing 60 on bearing bracket 48. In this manner corner sweep mechanism 32 is freely pivotable relative to rake arm 24.

Pivot control arm 55 comprises a first elongated and watertight hollow arm 62 attached at one end to frame pivot arm 39 and at the opposite end is slidably inserted in the open end of an angled extension arm 63. Adjustable screw bolts 65 and 66 (FIGS. 5 and 6) are mounted at each side of the telescopic connection of arm 62 to extension arm 63. Upon adjustment of nuts 66 on bolts 65 and 66 support arm 62 is movable in directions into or out of extension 63 to alternately raise or lower frame 35 to a desired height relative to tank bottom 22. In addition a guy rod 67 extends from sweep arm 36 to a bracket 68 attached to extension 63 at upper bearing bracket 48 to further support frame 35 in the adjusted position.

Means are provided for controlling movement of sweep mechanism 32 and includes a pair of spaced tension springs 69 and 70 (FIGS. 3, 4 and 7) having first ends secured to a bracket 71 on the end of arm 63 and second opposite ends attached to a bracket 72 fixedly secured to upper chord 28 of rake arm 24. In this manner pivot arm 39 is normally urged into continuous contact via a guide roller 73 secured to the free end of pivit arm 39 against the inner wall surfaces of sidewalls 21 of settling tank 10 during rotation of rake structure 11.

In accordance with the described structure with tension springs 69 and 70 under tension sweep arms 32-33 and rollers 73 of pivot arms 39 are urged into contact with the walls of settling tank 11. As rake structure 11 is rotated past the center line designated at B in FIG. 1 of tank 10 corner sweep structures 32 and 33 are maintained in retracted position with springs 69 and 70 fully extended (FIG. 1). As the rake arm 24 passes a corner of settling tank 10 springs 69 and 70 contract and pivot sweep rake arms 36 into and around the corner as guided by rollers 72 on pivot arms 39. Sweep mechanisms 32-33 are retracted as they leave a corner and gain extending spring 69-70 in preparation for the next corner cycle.

As will be appreciated from the foregoing description, the novel corner sweep mechanism described has many advantages in use. Among other advantages is the fact that the frame mechanism 36 is comprised of a minimum number of parts and provides a buoyant lightweight structure to thereby greatly reduce the load on the main rake structure an the force and torque requirements necessary to rotate the rake structure through a solids-liquid suspension in a settling tank such as tank 10. In addition a spring arrangement alone is provided for controlling the mechanism eliminating counterweights and other structure to effectively control operation of the corner sweep structure. As will be further appreciated although a dual spring 69-70 arrangement is described a one or more than two springs may be utilized in parallel in accordance with the size of the tank.

Although one embodiment of the present invention has been described in detail, it is to be expressly understood that the invention is not limited thereto. Various changes can be made in the design and arrangement of parts without departing from the spirit and scope thereof as the same will now be understood by those skilled in the art.

What is claimed is:

1. In a square-shaped settling tank for separating solids from a solids-liquid suspension, a feed supply inlet, a first outlet means at the top of the tank for discharging supernatant liquids separated from solids settled on the tank bottom, a second outlet means at the bottom of the tank for discharging said sludge, a rotary rake structure having rake arms effective to move solids over said tank bottom to said second outlet means and a supplemental corner sweep mechanism secured to said rotary rake structure for sweeping the corner areas of said tank bottom, said supplemental corner sweep rake mechanism comprising:
 a. a frame of triangular configuration suspended from and pivotally mounted to the outer end of said rotary rake structure with a corner sweep arm forming the base of said triangular frame and a pivot arm and a support arm for said pivot arm completing the sides of said triangular frame,
 b. said pivot arm and said support arm comprised of elongated watertight hollow members to provide buoyancy to said frame during movement thereof through a solids-liquid suspension over said tank bottom.
 c. guide means provided at one end of said pivot arm,
 d. a control arm connected to said pivot arm for controlling movement of said pivot arm, and
 e. a tension spring means interconnected at one end to said control arm and at the opposite end to said rotary rake structure to urge said guide means into constant contact with the inner wall surface of said tank and operable to move said pivot arm and said corner sweep arm into the corner areas of said tank bottom during rotation of said rotary rake structure.

2. The device of claim 1 wherein said tension spring means includes at least two parallel tension springs the ends of which are connected to said one end of said control arm and the opposite ends connected to said main rotary rake structure for controlling movement of said pivot arm.

3. The device of claim 1 wherein said control arm and said pivot arm are pivotally mounted at spaced connections to said main rotary structure.

4. The device of claim 3 wherein said spaced pivot connections includes vertically spaced bearing brackets on said main rotary rake structure, a vertical pivot pin connected to the inner ends of said pivot arm and said control arm and pivotally mounted in apertures provided in said bearing brackets.

5. The device of claim 1 wherein said control arm comprises a hollow extension arm connected to said pivot, and an elongated hollow second arm having one end connected to said frame pivot arm and the opposite end inserted in said extension arm for slidable movement therein to adjust the height of said corner sweep frame relative to the tank bottom and means for locking said second arm in an adjusted position.

6. The device of claim 5 wherein said adjusting means comprise screw bolts interconnected to said control arm and said extension arm and having nuts thereon for locking said arm members in selected adjusted position.

* * * * *